Sept. 15, 1959 R. V. CRAWFORD 2,904,674

RADIANT ENERGY HIGHWAY COMMUNICATION SYSTEM WITH CONTROLLED DIRECTIVE ANTENNA

Filed Nov. 29, 1956 3 Sheets-Sheet 1

INVENTOR
R. V. CRAWFORD
BY B. A. Stoddard
ATTORNEY

INVENTOR
R. V. CRAWFORD
BY B. H. Stoddard
ATTORNEY

INVENTOR
R. V. CRAWFORD
BY B. F. Stoddard
ATTORNEY 2,904,674
Patented Sept. 15, 1959

2,904,674

RADIANT ENERGY HIGHWAY COMMUNICATION SYSTEM WITH CONTROLLED DIRECTIVE ANTENNA

Robert V. Crawford, Dobbs Ferry, N.Y., assignor to Bell Telephone Laboratories, Incorporated, New York, N.Y., a corporation of New York Application November 29, 1956, Serial No. 625,127

5 Claims. (Cl. 250—6)

This invention relates to radiant energy communication systems and, more particularly, to a large area coverage mobile radio telephone system, such as a highway system.

In the highway mobile radio telephone art, for example, it has been the practice for the vehicular stations to be served by fixedly located radio transmitters situated at intervals along a highway. During the operation of a system of this type, the transmitters are all energized at the same time for transmitting carrier waves of the same assigned carrier frequency. These carriers are frequency modulated with duplicate signals applied from a central office connected to the transmitters by wire lines. Thus, as a vehicle proceeds along a highway, its radio receiving circuit is supplied with signal modulated carrier energy from first one transmitter and then another.

In order to avoid any interruptions in the reception of signals by a vehicular receiver that might occur when the vehicle travels from the service coverage area of one transmitter to the service area of an adjacent transmitter, all of the transmitters are so located as to provide overlapping service coverage areas. Although this arrangement insures that the mobile receivers will be constantly provided with signal modulated carrier energy of satisfactory level, it has the disadvantage of creating the possibility that, when a vehicular receiver is traveling in the overlapping service coverage area of two adjacent transmitters and is receiving both carriers with essentially equal strength, signal reception may be impaired by cochannel interference. This is due to the fact that, when a frequency-modulation receiver is subjected simultaneously to two essentially equal carriers, the resulting cochannel interference may produce distortion of the speech output of the receiver to such an extent as to render it unintelligible. The resulting loss of communication might, at times, be quite serious, particularly in a radio telephone system operated for police officers along a turnpike.

Accordingly, it is an object of this invention to provide an improved highway mobile radio telephone system.

It is also an object of this invention to provide a highway mobile radio telephone system with improved means for minimizing the occurrence of co-channel interference.

An additional object of the invention is to provide a radiant energy signaling station with automatically operated means for reversing the directivity of its antenna.

A further object of the invention is to provide a frequency-modulation receiver with automatically operated means for preventing its limiter circuit from being supplied with energy derived from two essentially equal carriers.

These and other objects of the invention are accomplished in a highway radio telephone system by providing means at the fixedly located transmitters for continuously modulating each of their carriers with one of two assigned low frequency tones; one tone being applied to the carriers radiated by alternately located transmitters and the other tone being applied to the carriers radiated by the intervening transmitters. Each moblie station is equipped with a bi-directional antenna array and automatically operated means for reversing the main lobe of the directivity pattern of the array in response to the mobile receiver being subjected to a condition which might produce co-channel interference. As is explained in detail hereinafter, this reversal of the orientation of the directive array causes the energies derived from the received carriers to be supplied to the limiter circuit in the receiver at sufficiently different amplitudes so that the limiter will be captured by carrier energy transmitted from only one of the fixedly located stations.

The automatically operated means at each mobile station include a sensing circuit which is responsive only to the simultaneous presence of both tones in the output circuit of the mobile receiver. The simultaneous presence of both tones is employed as an antenna directivity switching criterion because these two tones will appear together in the output circuit only when the conditions are present which might give rise to the occurrence of co-channel interference products. The automatic reversing means further include a bi-stable responder circuit which is activated in response to the operation of the sensing circuit. Activation of the responder circuit operates switching means associated with the antenna array carried by the vehicle for reversing the orientation of its directivity pattern. The antenna array remains oriented in this direction until the occurrence of another condition which might produce co-channel interference at which time its orientation is again automatically reversed. Thus, as is explained with greater particularity hereinafter, the switching of the directivity of the vehicular antenna is performed entirely automatically and does not require mental attention or the performance of any manual operation by an occupant of the vehicle. It can be readily understood that this automatic operation is especially useful and desirable in a communication system for police officers as it provides them with uninterrupted communication service without diverting their attention from the operation of their vehicles and the performance of their official duties.

These and other features of the invention are more fully discussed in connection with the following detailed description of the drawing in which.

Figure 1:
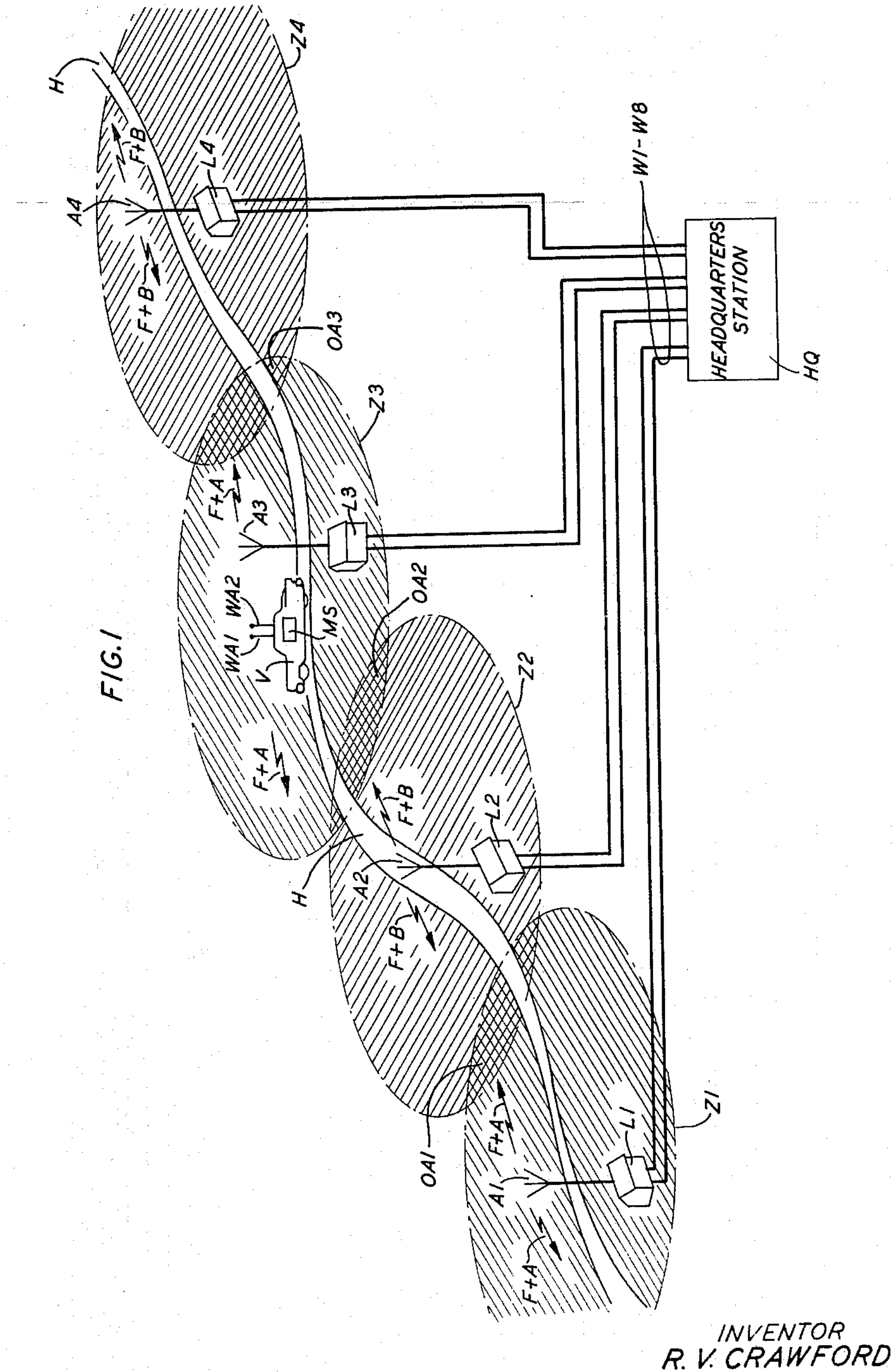
Fig. 1 is a schematic diagram of a highway mobile radio telephone system in accordance with the invention.

In Fig. 1, a radio telephone signaling system is represented as providing communication service to a mobile radio telephone station MS carried in a vehicle V traveling on a motor vehicle highway H. Although only one mobile station MS has been shown for purposes of simplicity, it is to be understood that the system may actually include a considerable number of similar mobile stations carried in other vehicles moving along the highway H. The system is shown to include a fixedly located headquarters station HQ connected by a plurality of wire transmission lines W1 to W8, inclusive, to a number of local radio telephone stations L1 to L4, inclusive. The local stations L1 to L4, inclusive, are fixedly located along the highway H and are spaced apart from each other at discrete intervals which are not necessarily equal. These local stations L1 to L4, inclusive, are each equipped with antennas A1 to A4, respectively, for radiating carrier waves of the same assigned mean carrier frequency F.

As the stations L1 to L4, inclusive, employ the lineof-sight method of radio transmission, it can be understood that each serves a particular geographic zone indicated in Fig. 1 at Z1 to Z4, respectively. Since each of the stations L1 to L4, inclusive, transmits its carrier waves on the same power level, it can be understood that the limits of each of the zones or service coverage areas Z1 to Z4, inclusive, are determined by the heights of the associated antennas A1 to A4, respectively, and the nature of the terrain. In order to avoid any interruptions in the reception of these carrier waves by the mobile station MS that might occur while the vehicle V is traveling from the service coverage area of one of the local stations to the service area of an adjacent local station, each of the local stations L1 to L4, inclusive, is so situated that its respective service coverage area will overlap the service coverage areas of the adjacent local stations as is indicated in the drawing at OA1, OA2, and OA3. Thus, the mobile station MS will always be within at least one of the service coverage zones Z1 to Z4, inclusive, as the vehicle V proceeds along the highway H.

In order to avoid any co-channel interference that might otherwise be produced in the receiving circuit of the mobile station MS while the vehicle V is traveling in an overlapping coverage area of two adjacent stations and is receiving carrier waves from both of them, the system disclosed herein employs two novel features. Firstly, the carrier waves sent from the alternately located stations L1 and L3 are modulated continuously with a low frequency tone A while the intervening stations L2 and L4 have their carriers continuously modulated with a different low frequency tone B. Secondly, the mobile station MS is equipped with an automatically reversible bi-directional antenna array comprising two whip-type antennas WA1 and WA2 mounted on the roof of the vehicle V. The manner in which this use of the tones A and B together with the reversible bi-directional antenna array WA1—WA2 of the mobile station MS functions automatically to avoid the production of co-channel interference products in the receiving circuit of the mobile station MS is explained hereinafter.

Figure 2:
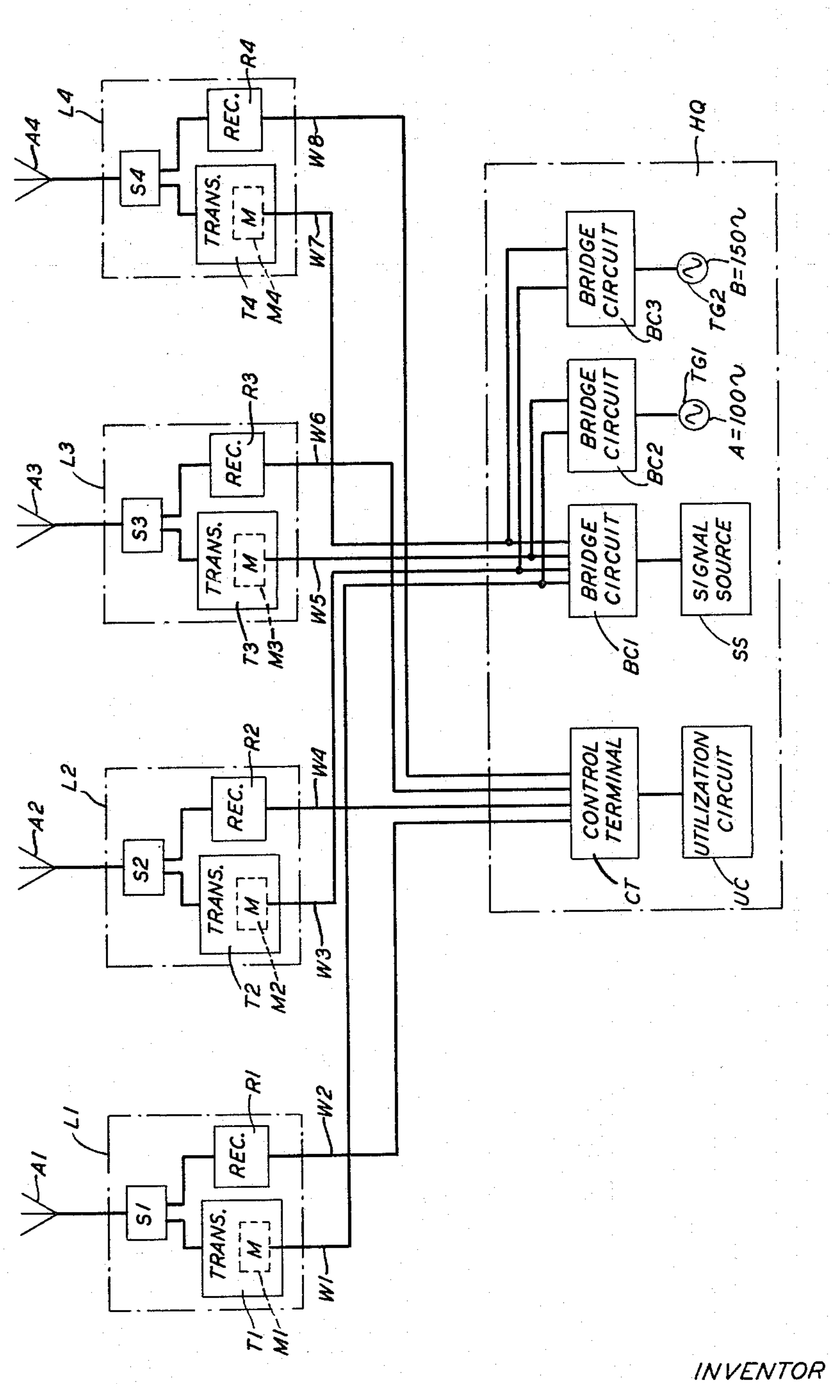
Fig. 2 is a block diagram illustrating the equipment components of the headquarter's station and the fixedly located transmitting and receiving stations.

In Fig. 2, it can be seen that the local stations L1 to L4, inclusive, are each equipped with conventional radio transmitters T1 to T4, respectively, which are each designed to generate carrier waves having the same power level and the same assigned mean carrier frequency F. The radio transmitters T1 to T4, inclusive, are each supplied with conventional modulators M1 to M4, respectively, of suitable design for modulating the frequency of their carrier waves with message signals and also with either tone A or tone B. The input circuits of the modulators M1 to M4, inclusive, are each coupled to the wire lines W1, W3, W5, and W7 extending to the headquarters station HQ.

In addition, the local stations L1 to L4, inclusive, are also each provided with conventional radio receivers R1 to R4, respectively, which are tuned to receive carrier waves transmitted from the mobile station MS. The output circuits of the receivers R1 to R4, inclusive, are each coupled to wire lines W2, W4, W6, and W8, respectively, extending to the headquarters station HQ. For purposes of simplicity, the wire transmission lines W1 to W8, inclusive, have each been shown in the drawing as single lines, but it is to be understood that they each may actually be conventional two-wire or four-wire lines. Since the local stations L1 to L4, inclusive, are each shown as having only one antenna A1 to A4, respectively, they each include a conventional transmit-receive switch S1 to S4, respectively, of suitable design for alternatively coupling their respectively associated antennas either to their respectively associated transmitters or to their respectively associated receivers.

Fig. 2 also shows that, at the headquarters station HQ, each of the output lines W2, W4, W6, and W8 from the local receivers R1 to R4, inclusive, is coupled to one side of a conventional control terminal CT of suitable design having its output circuit coupled to an appropriate utilization circuit UC such as a telephone switchboard. The headquarters station HQ is also shown to include a message signal source SS of any suitable type, such as a telephone switchboard, coupled to one side of a conventional bridge circuit BC1. The other side of the bridge circuit BC1 is coupled to each of the wire lines W1, W3, W5, and W7 leading to the input circuits of the modulators M1 to M4, inclusive, at the local stations L1 to L4, respectively.

The headquarters station HQ also includes two conventional tone generators TG1 and TG2 producing, respectively, a first low frequency tone A, such as 100 cycles, and a second low frequency tone B, such as 150 cycles. The tone generator TG1 is coupled to one side of a second conventional bridging circuit BC2 having its other side coupled to the wire lines W1 and W5 leading to the modulators M1 and M3 at the alternately located local stations L1 and L3, respectively. Similarly, the tone generator TG2 is coupled to one side of a third conventional bridging circuit BC3 having its other side coupled to the wire lines W3 and W7 extending to the modulators M2 and M4 at the intervening local stations L2 and L4, respectively.

Thus, during operation of the system, message signals from the source SS are transmitted simultaneously over the wire lines W1, W3, W5, and W7 to the input circuits of the modulators M1 to M4, inclusive. At the same time, tone A is sent over the lines W1 and W5 to the modulators M1 and M3, respectively, while tone B is sent over the lines W3 and W7 to the modulators M2 and M4, respectively. Therefore, the antennas A1 to A4, inclusive, will each radiate simultaneously carrier waves having their frequency modulated with the same message signals. In addition, the carriers radiated by the antennas A1 and A3 of the alternately located stations L1 and L3 will have their frequency continuously modulated with the first tone A while the carriers radiated by the antennas A2 and A4 at the intervening stations L2 and L4 will have their frequency continuously modulated with the other tone B.

Figure 3:
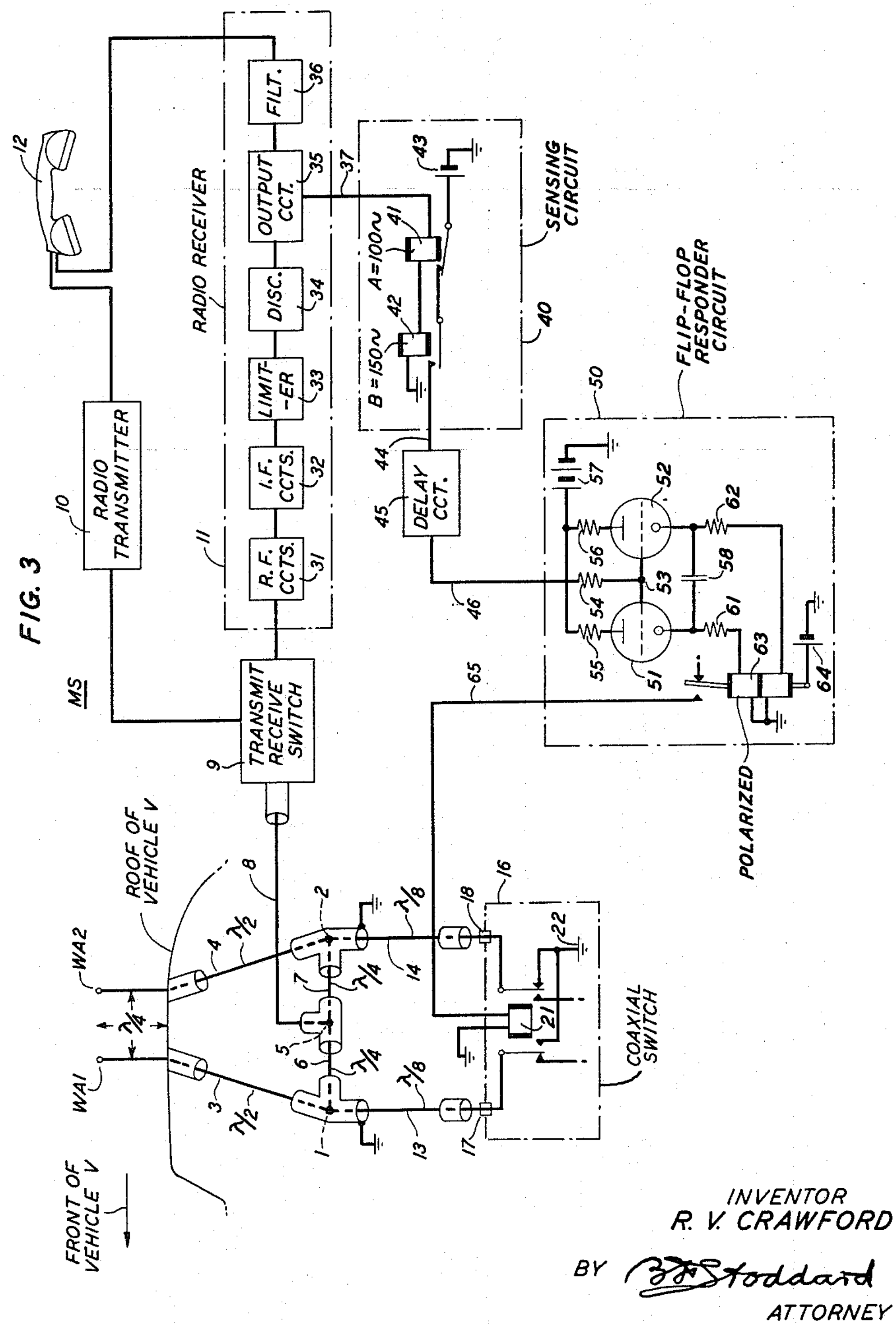
Fig. 3 is a detailed circuit diagram of the equipment at a representative mobile station in this system.

In order to receive the modulated carrier waves thus transmitted from the local stations L1 to L4, inclusive, the mobile station MS, which is representative of the other mobile stations in this system, is equiped with an automatically reversible bi-directional antenna array WA1—WA2 as was stated above. Before discussing the instrumentalities which function automatically to effect a reversal of the main lobe of the directivity pattern of the array WA1—WA2, it should be understood that the configuration of the bi-directional array WA1—WA2 by itself may be of any suitable design known to those skilled in the art. Accordingly, for purposes of illustration, it is shown in Fig. 3 to include two whip-type antennas WA1 and WA2 mounted along the longitudinal center line of the roof of the vehicle V. The height of the antennas WA1 and WA2 and the spacing between them are each essentially equal to one-fourth of the length of a wave at the operating frequency of this radio system.

The antennas WA1 and WA2 are connected respectively to two coaxial T connectors 1 and 2 by two flexible coaxial cables 3 and 4, respectively, each having a length which is equal to an integral multiple of one-half of the length of a wave at the speed of propagation in the cables 3 and 4. The T connectors 1 and 2 are each connected to a third coaxial T connector 5 by two additional coaxial cables 6 and 7, respectively, each having a length equal to one-fourth of the length of a wave in the cables 6 and 7. The T connector 5 is coupled by a noncritical length of coaxial cable 8 to a transmit-receive switch 9. The switch 9, which may be of any suitable type known to those skilled in the art, functions to couple the cable 8 alternatively either to a conventional radio transmitter 10 or to a conventional radio receiver 11, each of which is coupled to a conventional telephone instrument 12.

In order to obtain the desired reversible directivity pattern, two phasing stub coaxial line sections 13 and 14 are employed together with a coaxial switch 16 of any suitable design known to those skilled in the art. Based on the speed of propagation of a wave in the coaxial lines 13 and 14, they will each have a length equal to one-eighth of a wavelength. The coaxial lines 13 and 14 are connected respectively to the T connectors 1 and 2 and also to two terminals 17 and 18, respectively, of the switch 16. As can be seen in Fig. 3, the alternative paths extending from the terminals 17 and 18, through the coaxial switch 16 have been represented by single lines. However, it is to be understood that, as is well known to those skilled in the art, these paths are actually constituted by coaxial components.

The coaxial switch 16 includes an electromagnetic relay 21 which is shown in its unenergized condition with its two armatures in engagement with their break contacts. Under this condtion, the lower end of the coaxial line 13 terminates in an open circuit and thereby acts like a capacitive reactance to advance the phase of the waves at its upper end by 45 degrees. At the same time, the coaxial line 14 is shorted at its lower end, by reason of its inner conductor being now connected to ground 22 and therefore performs like an inductive reactance to retard the phase of the waves at its upper end by 45 degrees. Thus, the net result is to produce a cardiod directivity pattern in the horizontal plane. Since the antenna WA1 is indicated as being located toward the front of the vehicle V and the antenna WA2 toward the rear, then, with the coaxial switch 16 in the condition shown in Fig. 3, the voltage impressed across the front antenna WA1 will lead that impressed across the rear antenna WA2 by 90 degrees so that the antenna array WA1—WA2 is directive toward the rear of the vehicle V.

When the relay 21 becomes energized in a manner that is explained in detail hereinafter, it operates its armatures and causes them to engage their make contacts. This action reverses the terminations of the cables 13 and 14 so that cable 13 will now be connected to ground 22 while cable 14 will now be terminated in an open circuit. Accordingly, the voltage impressed across the front antenna WA1 will now lag behind that impressed across the rear antenna WA2 by 90 degrees with the result that the antenna array WA1—WA2 will now be directive toward the front of the vehicle V. Thus, it can be understood that by either de-energizing or energizing the winding of the relay 21 in the coaxial switch 16, the main lobe of the directivity pattern of the antenna array WA1—WA2 can be directed either in the direction of travel of the vehicle V or in the opposite direction.

The instrumentalities which function automatically to effect a reversal of the main lobe of the directivity pattern of the array WA1—WA2 will now be described in detail. These instrumentalities are responsive to energy derived from tone modulated carrier waves received at the mobile station MS and supplied to the radio receiver 11. As is indicated in Fig. 3, the radio receiver 11 includes the usual radio frequency circuits 31 and intermediate frequency circuits 32 followed by a conventional amplitude limiter circuit 33. The output energy from the limiter 33 is applied to a conventional discriminator circuit 34 and the resulting energy is supplied to the usual output circuit 35 which is coupled to the telephone instrument 12 by a filter 36 designed to block the low frequency tones A and B.

The output circuit 35 is also coupled over a lead 37 to a sensing circuit 40 which includes two resonant relays 41 and 42 each having a tuned reed type of armature which is set into strong vibration only when the frequency of the electronic energy applied to its associated coil approximates the natural frequency of vibration of the reed. Relay 41 is tuned to operate at 100 cycles so as to be responsive to tone A while relay 42 is tuned to operate at 150 cycles thereby being responsive to tone B. The armatures and contacts of relays 41 and 42 are connected into a series path extending from a battery 43 over a lead 44 to a delay circuit 45 which, in turn, is connected over a lead 46 to a responder circuit 50.

The responder circuit 50 comprises a flip-flop circuit which may be of any suitable design known to those skilled in the art. For purposes of illustration, it is shown to include two gas filled tubes 51 and 52, such as cold cathode ionic tubes. The control elements of the tubes 51 and 52 are each connected to a junction point 53 which is coupled by a current limiting resistor 54 to the lead 46 from the delay circuit 45. The anodes of tubes 51 and 52 are coupled through resistors 55 and 56, respectively, to a common battery 57. The cathodes of the tubes 51 and 52 are connected to a common capacitor 58 and are also each connected to resistors 61 and 62, respectively. The other ends of the resistors 61 and 62 are connected to the energizing windings of a polarized relay 63 which is so designed that its armature controls the application of current from a battery 64 to a lead 65 extending to the energizing winding of the relay 21 in the coaxial switch 16.

The flip-flop responder circuit 50 is a bi-stable circuit in that, when current from battery 43 is applied to it, it operates and remains locked in one of two alternative conditions until the next application of current from battery 43. These two conditions are, firstly, that tube 51 is ionized and is passing current from battery 57 through the upper winding of relay 63 to effect the engagement of its armature with its left contact and, secondly, that tube 52 is ionized and is passing current through the lower winding of relay 63 to effect the engagement of its armature with its right contact. The manner in which this is accomplished will now be explained assuming for descriptive purposes that tube 52 is in an ionized condition and has caused the armature of relay 63 to be moved against its right contact as is indicated in Fig. 3.

Now, when the relays 41 and 42 become jointly energized, in a manner that will be explained in more detail hereinafter, current from battery 43 will be applied through the series path over their operated armatures to the junction point 53 and to the control element of tube 51. This causes the tube 51 to break down and to become ionized thus permitting current to flow from the battery 57 through resistor 55, tube 51, resistor 61, and then through the upper winding of relay 63. In turn, this changes the charge on the capacitor 58 thereby raising the cathode potential of the tube 52 to a point where there will not be a sufficient voltage drop to sustain ionization in the tube 52. Accordingly, tube 52 becomes extinguished and consequently terminates the flow of current through the lower winding of relay 63. As a result, the current now flowing in the upper winding of relay 63 will be effective to cause relay 63 to move its armature into engagement with its left contact thus applying current from battery 64 to the winding of relay 21. This causes relay 21 to operate its armatures thereby producing an effect which, as is explained in more detail hereinafter, terminates the joint energization of relays 41 and 42 in the sensing circuit 40.

It should be noted that as soon as the tube 51 becomes energized, it is no longer dependent on current from the battery 43 in the sensing circuit 40 but is held in its ionized condition by current from battery 57. The tube 51 remains in this ionized condition until relays 41 and 42 again become jointly energized at which time current from battery 43 will again be applied to the junction point 53. This will cause the tube 52 to break down and to become ionized. In turn, this effects the termination of the ionization of tube 51 in a manner similar to that described above for tube 52. Accordingly, current will cease to flow in the upper winding of relay 63 but will now flow through its lower winding. This causes relay 63 to move its armature into engagement with its right contact thereby disconnecting the battery 64 from the winding of relay 21 which consequently releases its armatures.

The operation of this radio telephone system will now be described with reference firstly, to a condition in which the vehicle V carrying the mobile station MS is traveling in the service coverage zone of only one of the local stations L1 to L4, inclusive. Accordingly, let it be assumed that the vehicle V is in the situation represented in Fig. 1 wherein it can be seen that the vehicle V is in the service zone Z3 of the local station L3 and is receiving carrier waves radiated only from the antenna A3. Let it further be assumed that, at the time when the vehicle V starts its travel, its flip-flop responder circuit 50 is in the condition shown in Fig. 3 wherein tube 51 is not ionized while tube 52 is ionized and has effected the movement of the armature of relay 63 into engagement with its right contact. Under this condition, the relay 21 in the coaxial switch 16 will be de-energized and its armatures will be in their released positions thus causing the main lobe of the directivity pattern of the antenna array WA1—WA2 to be directive toward the rear of the vehicle V so as to receive strongly from station L3 carrier waves modulated with the tone A.

As the vehicle V proceeds along the highway H, it enters the overlapping area OA2 and its radio equipment begins to receive from station L2 carrier waves modulated with the tone B. However, due to the front-to-back discrimination of the directive antenna array WA1—WA2, the co-channel carrier energies now received simultaneously from stations L2 and L3 will not be supplied to the radio receiver 11 with equal itensities. Therefore, at first, the level of the energy derived from the carrier waves received from station L2 will be so much lower than the level of the energy derived from the carrier waves received from station L3 that they will be excluded by the limiter 33 in the radio receiver 11. This is due to the fact that, as it well known to those skilled in the art, when two currents of substantially the same mean frequency and having an amplitude difference in excess of approximately 6 decibels are applied simultaneously to the limiter 33, it will discriminate in favor of the current of higher level with the weaker current producing only a slight frequency modulation of the stronger current. Thus, the limiter 33 has the characteristic function of acting, in effect, as a selector of the wave of greater amplitude, with the weaker wave being substantially excluded.

Later, as the vehicle V moves further into the overlapping area OA2 so that it is closer to station L2 than it is to station L3, the carrier from station L2 will be received with such strength as to compensate for the front-to-back discrimination of the directive array WA1—WA2. Thus, the vehicle V will reach a point at which the energy derived from the carrier from station L2, would ordinarily be applied to the limiter 33 with nearly the same intensity as the energy derived from the carrier from station L3. Since the limiter 33 would then be unable to discriminate effectively between these energies, the speech output from the radio receiver 11 would ordinarily be distorted. However, this is avoided due to the fact that both tone A and tone B will now be present in the output circuit 35 of the radio receiver 11 and will be applied along the lead 37 to the sensing circuit 40 where they will cause relays 41 and 42 to operate jointly their armatures. This closes the path for supplying current from battery 43 to the flip-flop circuit 50. As it was assumed above that tube 52 was initially ionized, tube 52 will now be extinguished and tube 51 will become ionized to cause relay 63 to move its armature into engagement with its left contact thereby applying current from battery 64 to the winding of relay 21 in the coaxial switch 16. Relay 21 accordingly operates its armatures to reverse the terminations of the coaxial lines 13 and 14 and to thereby reverse the main lobe of the directivity pattern of the antenna array WA1—WA2 in the manner described above so that it will now be directive toward the front of the vehicle V.

This directivity reversal of the antenna array WA1—WA2 causes the intensity of the energy derived from the carrier waves received from station L2 to be appreciably increased while the intensity of the energy derived from the carrier waves received from station L3 is appreciably attenuated. In other words, the directive array WA1—WA2 now provides gain for carrier energy from station L2 and at the same time imposes loss upon the carrier energy from station L3. Therefore, when the currents derived from these two carriers are now applied to the input of the limiter 33, the difference between the amplitude of one and amplitude of the other will be sufficiently large to enable the limiter 33 to perform its characteristic function of virtually eliminating the current of lower level. Co-channel interference will consequently be avoided because the limiter 33 will now be captured by energy derived from the carrier received from station L2.

Due to this capture of the limiter 33 by the carrier from station L2, the tone A will no longer be present in the output circuit 35 of the receiver 11 and only tone B will now be applied over the lead 37 to the relays 41 and 42. Although this causes relay 42 to hold its armature operated, relay 41 will now release its armature thereby disconnecting battery 43 from the path leading to the flip-flop responder circuit 50. This action does not alter the present condition of the flip-flop circuit 50 because, as was explained above, the tube 51 is locked in its ionized condition by current from battery 57. Therefore, the antenna array WA1—WA2 will remain in the condition wherein it is directive toward the front of the vehicle V. Thus, during the passage of the vehicle V through the overlapping area OA2, its radio receiver 11 is constantly protected automatically from being subjected to co-channel interference.

It should be noted that the intensities of the energies derived from the two carriers may be nearly equal at more than one location within the overlapping area OA2, due to the variations in the surrounding terrain, and would thereby cause momentary operations of the sensing circuit 40. Accordingly, it is desirable to prevent a momentary operation of the sensing circuit 40 from activating the responder circuit 50. This is accomplished by means of the delay circuit 45 which may be of any convenient design, such as a simple resistor-capacitor combination. The delay circuit 45 is adjusted to provide a suitable delay in the application of current from battery 43 to the responder circuit 50 so that it will not be activated when the tones A and B appear together in the sensing circuit 40 only momentarily.

If it had been assumed that, at the time when the vehicle V started its travel, its flip-flop responder circuit 50 was in the condition wherein tube 51 was ionized but tube 52 was not ionized, then the armature of relay 63 would be in engagement with its left contact. Under this condition, the relay 21 in the coaxial switch 16 would be energized and its armatures would be in their operated positions thus causing the main lobe of the directive array WA1—WA2 to be directed to the front of the vehicle V. On the basis of this assumption, it can be understood that, with the vehicle V in the position shown in Fig. 1, the array WA1—WA2 will be oriented in a direction opposite from the antenna A3 of station L3. This is not objectionable because the proximity of the vehicle V with respect to station L3 at this time compensates for the adverse front-to-back discrimination of the array WA1—WA2 with the result that the carrier waves radiated from the antenna A3 will be received on a satisfactory level.

With the array WA1—WA2 thus oriented toward the front of the vehicle V, it can be understood that, when the vehicle V now enters the overlapping area OA2, the front-to-back discrimination of the array WA1—WA2 will tend to favor the reception of carrier from station L2. Accordingly, as the vehicle V moves forward in the overlapping area OA2, the point at which the level of the energy derived from the carrier from station L2 will match the level of the energy derived from the carrier from station L3 will be reached more quickly than in the preceding example. When this occurs, both tones A and B will be supplied to the relays 41 and 42 causing them to operate jointly their armatures thereby applying current from battery 43 to the responder circuit 50. This effects the ionization of tube 52 and causes tube 51 to become extinguished as was explained above. Relay 63 consequently moves its armature into engagement with its right contact to de-energize relay 21 and to thereby effect a reversal of the directivity of the array WA1—WA2 so that its main lobe will now be directed toward the rear of the vehicle V.

This reversal of the directivity of the array WA1—WA2 causes it to favor the reception of carrier waves from station L3 and, since the point at which this reversal took place is not as far inside the overlapping area OA2 as in the first example described above, it can therefore be understood that the level of the energy now derived from the carrier from station L2 will be appreciably lower than the level of the energy derived from the carrier from station L3. The limiter 33 will accordingly be able to exclude energy derived from the carrier from station L2. As only the tone A will now be supplied to the sensing circuit 40, relay 42 will release its armature and the tube 52 in the responder circuit 50 will remain locked in an ionized condition. Accordingly, the vehicle V continues its travel in the overlapping area OA2 with its array WA1—WA2 oriented toward station L3.

As the vehicle V moves further into the overlapping area OA2 and becomes nearer to station L2 than it is to station L3, it will reach the point referred to in the first example described above. This is the point at which the carrier from station L2 is received with such strength as to compensate for the front-to-back discrimination of the array WA1—WA2 with the result that the energies derived from the carriers from stations L2 and L3 are applied to the limiter 33 at nearly equal levels. The occurrence of this condition would ordinarily subject the radio receiver 11 to co-channel interference. However, as soon as this condition appears, both tone A and tone B will be applied to the relays 41 and 42 to effect automatically the operation of the coaxial switch 16 which, in turn effects a reversal of the directivity of the array WA1—WA2 so that it will now be oriented toward the front of the vehicle V. As was described above, this effects the production of a sufficiently large amplitude difference between the applied energies so that the limiter 33 will be able to discriminate between them. The result of this action is that co-channel interference will be avoided because the limiter 33 will now be captured by energy derived from the carrier received from station L2.

In view of the above discussion, it can be understood that whether the vehicle V started its travel in the service zone Z3 with its array WA1—WA2 oriented toward the rear of the vehicle V, as in the first example described above, or oriented toward the front of the vehicle V, as in the second example, it will enter the service zone Z2 of station L2 with its array WA1—WA2 oriented toward the front of the vehicle V so that the front-to-back discrimination of the array WA1—WA2 will favor the reception of carrier waves transmitted from station L2. This orientation of the array WA1—WA2 will remain unchanged until the vehicle V enters another overlapping service area.

Let it be assumed that the vehicle V continues its travel along the highway H and enters the next overlapping area OA1 with its array WA1—WA2 still oriented toward the front of the vehicle V. Since station L2 is now behind the vehicle V while the front of the vehicle V is now directed toward station L1, it can be understood that the directivity of the array WA1—WA2, although unchanged, will now favor the reception of carrier waves transmitted from the station L1. Accordingly, when the level of the energy derived from the carrier from station L1 becomes nearly equal to the level of the energy derived from the carrier from station L2, the radio receiver 11 will again require protection against co-channel interference. The necessary protection will be supplied automatically because, as soon as this condition occurs, the output circuit 35 of the radio receiver 11 will supply both tone A and tone B to the sensing circuit 40 which, in turn, will activate the responder circuit 50 thereby changing the condition of the coaxial switch 16 and causing it to effect a reversal of the main lobe of the array WA1—WA2.

Thus, through repetition of the above-described automatic switching operations, the vehicle V can travel the length of the highway H with its radio receiver 11 being constantly protected automatically against co-channel interference.

It is to be understood that the principles and features of operation of the invention are not limited to a highway radio telephone system but may be used with advantage in other forms of large area coverage radiant energy signaling systems employing other methods of signal modulation and having other types of vehicles, such as ships, airplanes, or railroad trains.

What is claimed is:

1. A radiant energy communication system comprising in combination a first transmitter sending radiant energy having a first distinguishing characteristic, a second transmitter sending radiant energy having a second distinguishing characteristic, the energy sent from the second transmitter being of the same assigned frequency as the energy sent from the first transmitter, a mobile receiver moving between said transmitters and tuned to receive energy transmitted by them, said receiver having an output circuit, directive antenna means coupled to said receiver for movement therewith, and reversing means for reversing the directivity of said antenna means, said reversing means including electro-responsive means tuned to respond solely to the presence of both of said first and second characteristics simultaneously in said output circuit of said receiver.

2. A radio telephone system providing communication service along a motor vehicle highway, said system comprising in combination a plurality of radio transmitters radiating carrier waves of the same assigned mean carrier frequency, each of said transmitters being fixedly located at separate intervals along said highway, a radio receiver tuned to said assigned mean carrier frequency of said transmitters and carried in a motor vehicle traveling on said highway, and means for enabling said receiver to distinguish between carrier waves transmitted by adjacent transmitters, said means including first instrumentalities continuously impressing a first distinctive tone signal upon the carrier waves radiated by alternately located transmitters, second instrumentalities continuously impressing a second distinctive tone signal upon the carrier waves radiated by the intervening transmitters, selective means in said radio receiver adjusted to provide a maximum response to carrier waves received from one of said transmitters, and electroresponsive means for readjusting said selective means to provide a maximum response to carrier waves received from another of said transmitters, said electroresponsive means being tuned to respond solely to the simultaneous reception by said receiver of both of said tone signals.

3. A radio telephone system providing communication service along a motor vehicle highway, said system comprising in combination a plurality of radio transmitters radiating carrier waves of the same assigned mean carrier frequency modulated with the same message signals, each of said transmitters having a discrete service coverage area, each of said transmitters being fixedly located along said highway and spaced apart from each other so that the service coverage area of one transmitter overlaps the service coverage area of an adjacent transmitter, a radio receiver tuned to said assigned mean carrier frequency of said transmitters and carried in a motor vehicle traveling on said highway, a directive antenna array coupled to said receiver for movement therewith, said antenna array having a reversible directivity pattern and being initially oriented so that its main lobe is directed in the direction of travel of the vehicle, and control means including switching means for reversing the orientation of said antenna array so that its main lobe is directed in the opposite direction, said control means further including electroresponsive means for actuating said switching means, said electroresponsive means being tuned to respond solely to the reception of carrier waves simultaneously from more than one of said transmitters.

4. A radio telephone system in accordance with claim 3 and including first means for continuously impressing a first distinctive signal upon the carrier waves radiated by alternately located transmitters, second means for continuously impressing a second distinctive signal upon the carrier waves radiated by the intervening transmitters, said electroresponsive means including a flip-flop circuit having a first and a second condition of operation, and a sensing circuit tuned to respond to the reception by said radio receiver of only one of said first and second distinctive signals for maintaining said flip-flop circuit in its first condition of operation, said sensing circuit being further tuned to respond to the simultaneous reception by said radio receiver of both of said first and second distinctive signals for placing said flip-flop circuit in its second condition of operation.

5. A radiant energy signaling system comprising in combination a plurality of transmitters radiating carrier waves of the same assigned mean carrier frequency, said transmitters being fixedly located and spaced apart from each other at discrete intervals with the service coverage area of one transmitter overlapping the service coverage area of an adjacent transmitter, a mobile receiver moving in one of said overlapping service areas and tuned to the frequency of said carrier waves, a directive antenna coupled to said receiver, said receiver being equipped with an amplitude limiter circuit having the property of virtually suppressing the weaker of two applied waves of the same assigned mean carrier frequency, said system being characterized by having instrumentalities for preventing said limiter from being supplied with two waves of substantially equal intensity from said transmitters, said instrumentalities including means for continuously modulating the frequency of alternately located transmitters with a first frequency and for continuously modulating the frequency of the intervening transmitters with a second frequency, first frequency selective means connected to said receiver for separately sensing the presence of wave energy of said first frequency in wave energy received by said receiver, second frequency selective means connected to said receiver for separately sensing the presence of wave energy of said second frequency in wave energy received by said receiver, means for changing the directivity of said antenna, actuating means for operating said directivity changing means, a source of electric current for energizing said actuating means, and circuit means for connecting said source to said actuating means only when energies of both said first frequency and said second frequency are received simultaneously by said receiver, said circuit means having two series portions, first electroresponsive means operated only by the sensing by said first frequency selective means of said first frequency for closing one of said series circuit portions, and second electroresponsive means operated only by the sensing by said second frequency selective means of said second frequency for closing the other of said series circuit portions whereby said source is connected to said actuating means only when both of said series circuit portions are closed by the concurrent operation of said first and second electroresponsive means.

References Cited in the file of this patent

UNITED STATES PATENTS

| | | |
|---|---|---|
| 1,927,827 | Goldsmith | Sept. 26, 1933 |
| 2,349,976 | Matsudaira | May 30, 1944 |
| 2,421,017 | Deloraine et al. | May 27, 1947 |
| 2,588,930 | Kendall et al. | Mar. 11, 1952 |

OTHER REFERENCES

A.I.E.E. Transactions, vol. 72, September 1953, "The New Jersey Turnpike—A Unique Highway Communication System," pp. 360–369.